Jan. 11, 1927.
H. G. PETERSON
1,613,769
CALENDAR
Filed August 13, 1925
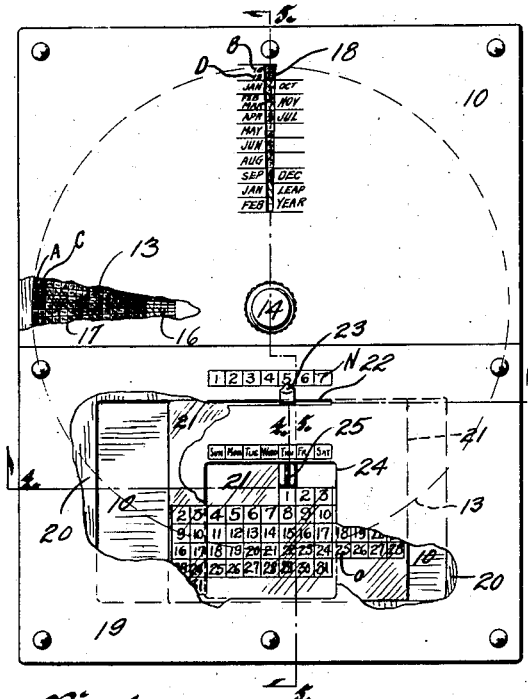
Fig.1.
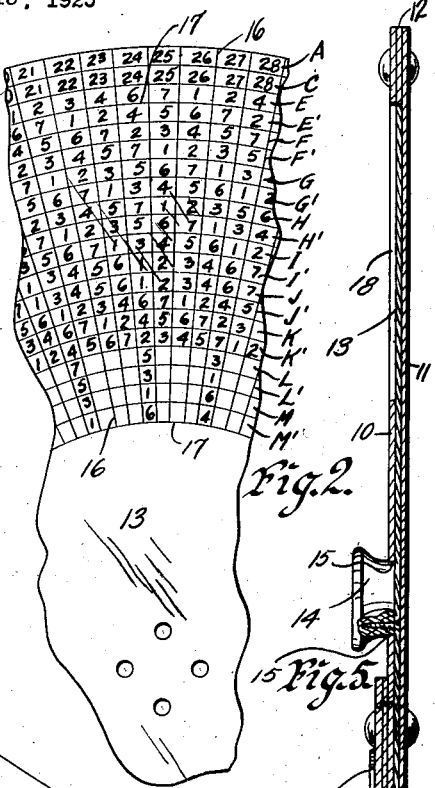
Fig.2.
Fig.5.
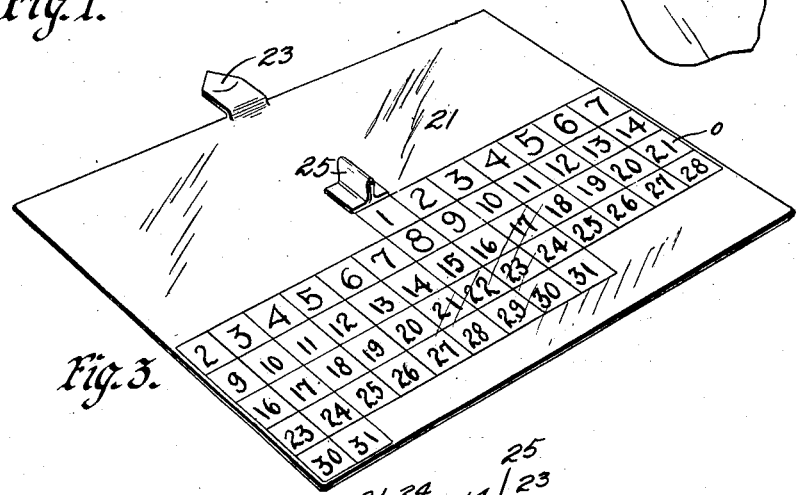
Fig.3.
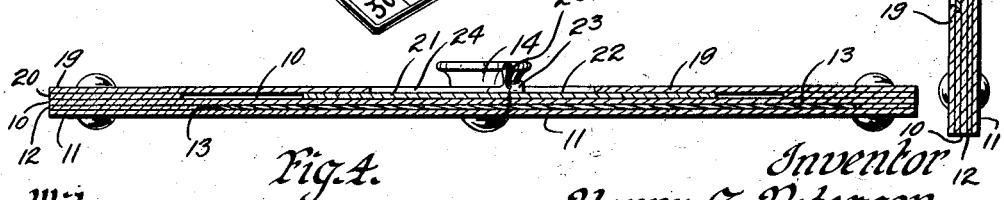
Fig.4.
Witness
Inventor
Henry G. Peterson
by Bair & Freeman Attorneys Patented Jan. 11, 1927.

1,613,769

UNITED STATES PATENT OFFICE.

HENRY G. PETERSON, OF AMES, IOWA.

CALENDAR.

Application filed August 13, 1925. Serial No. 50,135.

The purpose of my invention is to provide a calendar of simple, durable and inexpensive construction having parts so adjustable that the same calendar can be used for a long period of years.

With this and other objects in view, my invention consists in the construction, arrangement and combination of the various parts of my device, whereby the objects contemplated are attained, as hereinafter more fully set forth, pointed out in my claim, and illustrated in the drawing herewith, in which:

Figure 1 shows a plan view of my calendar, parts being broken away.

Figure 2 is a fragmental plan view of part of the rotary disc used in the calendar.

Figure 3 is a perspective view of the slidable card forming part of the calendar.

Figure 4 is a detailed, sectional view taken on the line 4—4 of Figure 1; and

Figure 5 is a detailed, sectional view taken on the line 5—5 of Figure 1.

I have illustrated my calendar in the form of a device which can be used for a two hundred year period.

It will be seen from the description following that by appropriately modifying the calendar, it could be used for practically any period.

The calendar here illustrated is one covering the period of two hundred years from 1800 to 1999 inclusive.

Generally speaking, the calendar embodies a disc having numbers thereon arranged to appear through a suitable sight opening, the disc being rotatably mounted, and a slidable sheet having suitable figures thereon adapted to appear through a sight opening.

The calendar, of course, can be embodied in various forms, but as here illustrated it comprises a sheet of paste board indicated by the numeral 10. This sheet really forms part of a casing or enclosing element composed of the front sheet 10 and a back sheet 11.

Filler strips 12 may be provided between the sheets 10 and 11 around the edges thereof. Between the sheets 10 and 11 is a disc 13 mounted for rotation on a knob or the like 14, which projects through a suitable opening 15 in the front face or sheet 10 of the casing.

The disc 13 has on its face, equally spaced radial lines 16 and also a series of circumferential lines 17. The lines 16 and 17 are used simply for convenience to the eye in distinguishing the figures or numbers to be hereafter referred to.

Between the successive lines 16, figures are arranged in radial columns as shown in Figure 2. These figures are also arranged in circumferential rows between the successive lines 17.

The sheet or member 10 is provided in its upper portion with a vertically, elongated slot 18, so shaped as to form a sight opening for properly exposing to view one of the radial rows or columns of figures at a time.

Adjacent to the slot 18 at the outer end thereof at the left-hand side of said slot and in line with the outer circumferential row of figures indicated at A in Figure 2 in the calendar here illustrated is placed the number 18 as indicated at B in Figure 1.

In the row A of figures in the successive radial columns are arranged the numerals "00", "01", "02", up to "99". Thus by rotating the disc 13 to the proper position, the numbers 18 may be combined with the successive radial columns or rows for forming the combinations "1800", "1801," and so on up to "1899".

In the next inner circumferential row C (see Figure 2) numerals are arranged similar to the numbers in the circumferential row A.

At the left of the slot 18 in line with the row C are the numbers 19 as indicated at D. It will thus be seen that by rotating the disc 13, the numbers 19 shown at D may be combined with any of the numbers in the circumferential row C to make the combinations "1900", "1901" and so on up to "1999".

It will thus be seen that when any radial row of figures on the disc 13 is exposed through the sight opening formed by the slot 18, there will appear through the sight opening a column of figures headed at the top by figures indicating years, for example "1801" or "1901" and so on.

Below the figures 19 on the face of the sheet 10, the word "Jan." or its equivalent is printed on the left of the slot 18 opposite the third and fourth circumferential rows of figures E and E' from the outside on the disc, and on the right-hand side of the slot, there is printed "Oct." or the equivalent thereof.

Next below "Jan." there is printed "Feb."

and "Mar." on the left side of the slot 18 opposite the next two circumferential rows of figures on the disc 13, to wit rows F and F'.

On the right-hand side of the slot 18 and in line with the same circumferential rows F and F' is printed "Nov." or the equivalent thereof.

Next below "Feb." and "Mar.", there is printed on the sheet 10 at the left of the slot 18, "Apr.", "May", "Jun.", "Aug.", "Sep.", "Jan." and "Feb.", respectively opposite the circumferential rows of figures G and G', H and H', I and I', J and J', K and K', L and L' and M and M'.

At the right of the slot and at the right of "Apr.", there is printed "Jul." At the right of the lower "Jan." and "Feb." on the sheet 10 at the right of the slot 18, I place the words "Leap Year." On the right hand of the slot 18 opposite "Sep." is printed "Dec."

The numbers in the respective radial columns on the disc 13 opposite the respective months, as indicated on the sheet 10, indicate different calendars, in the manner that will be hereinafter again referred to.

The sheet 10 forms the back of another case or enclosing structure, the front of which is formed by another sheet 19. Between the sheet 19 and the sheet 10 around the edges of the sheet 19 are filler strips 20.

Mounted between the sheets 19 and 10 for horizontal sliding movement is a card or sheet 21.

In the sheet 19 at the upper edge of the card 21 is a laterally elongated slot 22. On the sheet 21 is an indicating pointer or finger 23 projecting through the slot 22, as shown in Figure 1.

Above the slot 22 are arranged the numbers one to seven in order across the sheet as shown at N on Figure 1.

Printed on the sheet 21 are figures for the calendar for various months.

In the sheet 19 is a sight opening 24, as shown in Figure 1. The figures indicated at O on the sheet 21 are arranged so that there may be exposed through the sight opening 21 the calendar for any month commencing on any day of the week. For instance, the figures O are arranged in vertical and horizontal columns.

Taking the right-hand set of seven vertical columns, the top horizontal column has the figures one to seven inclusive, the next eight to fourteen inclusive, and so on for a month in which the first falls on Sunday. This calendar may be exposed through the sight opening 24 by sliding the calendar by means of the short handle 25.

When the calendar just mentioned is thus exposed, the pointer or finger 23 will be opposite the number 1 of the figures indicated at N, thus indicating calendar number 1.

When the sheet 21 is then slid to the right until the figure 23 indicates the number 2 of the numerals N, the right-hand vertical column of figures O will be concealed under the sheet 19, and the second to the eight vertical columns from the right on the sheet 21 will be exposed, thus exposing a calendar for a month in which the first day falls on Monday.

By moving the sheet 21 for successively covering an additional column of the figures at the right thereof, calendars will be successively exposed through the sight opening 24 for the various months beginning on the various days of the week. Thus calendar number one commences on the first, calendar number 2 on the second and so on.

The figures in the radial columns or rows on the disc 13 indicate the calendar on the sheet 21, which is to be exposed for any particular month of any particular year.

Thus, for example, if one desires to expose the calendar for the year 1925, the disc 13 is rotated until 25 in the circumferential row C on the disc 13 is opposite the figures 19, indicated at D on the sheet 10 whereupon there will appear opposite the letters "Jan." in the circumferential row E', the number 5. This indicates that calendar 5 on the sheet 21 should be exposed.

For convenience, I actually print the numbers on the disc 13, which have to do with years in the nineteenth century in one color, and the numbers having to do with the years in the twentieth century in another color.

It will thus be noted that opposite "Jan." on the sheet 10 are two circumferential rows of figures E and E' on the disc 13. The upper row has to do with the nineteenth century and the lower row with the twentieth century.

It will be seen therefore in the illustration mentioned that in the row E opposite "Jan." appears the number 7 for the year 1825, which indicates that calendar 7 on the sheet 21 should be exposed for January, 1825.

February and March are printed together opposite the circumferential rows F and F' because the calendars for February and March are the same. October is printed opposite January, because the same calendar serves for January and October in ordinary years. Similarly, November is printed opposite February and March, because in February, March and November, the first falls upon the same day of the week in ordinary years. July is opposite April and December opposite September, because in July the first falls upon the same day of the week as in April, and in December the first falls upon the same day of the week as September.

In order to take into consideration leap years, January and February are printed at the lower part of the column of months on the sheet 10 and in the radial columns, there are printed opposite the lower January and February on the sheet 10 in appropriate rows L and L' and M and M' running circumferentially of the disc, the numbers indicating the proper calendar for the months of January and February in leap year.

The rows L and L' and M and M' have no figures in those radial columns, which do not indicate leap years.

It will thus be seen that in a calendar of this kind, the disc 13 may be rotated to the position where the numbers at B or D combined with the numbers in the particular radial columns on the disc 13 will indicate any year from 1800 to 1999.

By then running down the column exposed through the slot 18, one may readily ascertain the particular calendar to be used for any month.

Thus if one turns the disc to indicate the year 1825, the disc will be in the same position as that mentioned in the illustration before used. If one then desires to see the calendar for September, 1825, he runs down the column exposed through the slot 18 to September, and finds in the row K, that September in 1825 is illustrated in calendar number 5. The sheet 21 is then slid laterally until the point 23 indicates "5" in the numbers, and it thus appears that September in 1825 commenced on Thursday.

Such a calendar as herein illustrated may be used for a long period of years, and therefore it would justify the expense of making it up in metal or suitable material for permanent use.

It will be seen that by proper modifications the calendar may be adapted for practically any period.

I claim as my invention:

In a calendar of the kind described, a member having an elongated sight opening therein, a disc rotatably mounted behind said member, said member having on its face adjacent to said sight opening characters indicating the months of the year, said disc having thereon numbers arranged in radial and circumferential rows, another member having a sight opening therein and having numbers thereon arranged from one to seven, and having a sight opening, a sheet arranged to slide under said sight opening for exposing calendar numbers on each day of the week, and an indicating means for showing which calendar should be exposed, so that when number one of said numbers one to seven is indicated, that calendar will be exposed in which the first of the month falls on Sunday, or as when number two of the numbers one to seven is indicated, that calendar will be exposed in which the first of the month falls on Monday and so on, the figures on said disc being arranged to indicate years at one end of each column exposed through the sight opening in said first member and with figures correspondingly exposed opposite respective months to indicate which of the calendars one to seven of said slidable member is appropriate for such month.

HENRY G. PETERSON.